(12) United States Patent  (10) Patent No.: US 7,894,957 B2
Carlson  (45) Date of Patent: Feb. 22, 2011

(54) DYNAMIC TACTICAL STEERING FEEDBACK

(75) Inventor: Martin M. Carlson, Tega Cay, SC (US)

(73) Assignee: Textron Innovations Inc., Providence, RI (US)

( * ) Notice: Subject to any disclaimer, the term of this patent is extended or adjusted under 35 U.S.C. 154(b) by 547 days.

(21) Appl. No.: 12/020,831

(22) Filed: Jan. 28, 2008

(65) Prior Publication Data

US 2009/0188226 A1   Jul. 30, 2009

(51) Int. Cl.
   *A01B 69/00*   (2006.01)
(52) U.S. Cl. .............................. 701/41; 701/33; 701/36; 701/50; 172/9
(58) Field of Classification Search ................... 701/33, 701/36, 41, 50, 60, 93; 172/4.5, 9; 56/10.2 R; 307/9.1, 66; 290/40 C
   See application file for complete search history.

(56) References Cited

U.S. PATENT DOCUMENTS 6,456,925 B1   9/2002   Romig

FOREIGN PATENT DOCUMENTS

| DE | 102006017406 | 10/2007 |
| EP | 1541446 | 6/2005 |
| EP | 1816052 | 8/2007 |
| WO | WO-2007/014030 | 2/2007 |

OTHER PUBLICATIONS

European Search Report for European Patent Application No. EP 08 16 9177 dated May 8, 2009.

*Primary Examiner*—Gertrude Arthur-Jeanglaude
(74) *Attorney, Agent, or Firm*—Harness, Dickey & Pierce, P.L.C.

(57) ABSTRACT

A dynamic tactical feedback system for a turf maintenance vehicle includes an input device that detects a steering angle and/or a ground speed of the turf maintenance vehicle. The input device transmits an input signal correlative to the steering angle and/or ground speed of the turf maintenance vehicle. The system also includes an output device that affects a steering resistance, a turning ratio, a speed limit, the ground speed and/or a turning angle limit of the turf maintenance vehicle. The system additionally includes a controller that receives the input signal and outputs a control signal to the output device based on the input signal so as to change the steering resistance, the turning ratio, the speed limit, the ground speed and/or the turning angle limit of the turf maintenance vehicle based on the input signal. A method of controlling the turf maintenance vehicle is also disclosed.

19 Claims, 5 Drawing Sheets

DYNAMIC TACTICAL STEERING FEEDBACK

FIELD

The present disclosure relates to a turf maintenance vehicle and, more particularly, relates to a dynamic tactical steering feedback system for a turf maintenance vehicle.

BACKGROUND

The statements in this section merely provide background information related to the present disclosure and may not constitute prior art.

Turf maintenance vehicles (i.e., grounds keeping vehicles) are used for grounds keeping purposes on golf courses, parks, and other locations. Ride-on mowers, for instance, typically include a power delivery system (e.g., an internal combustion engine, batteries, etc.), a ground traction system that receives power from the power delivery system, and a steering wheel assembly that allows the user to steer the mower. These mowers can move at fairly high speeds and have a high degree of maneuverability. Traveling at high speed and/or through tight turns, may require more skill to control the vehicle than when traveling at lower speed and/or in a straight line. On sloped or uneven terrain, even more skill may be required for optimal operation.

SUMMARY

A dynamic tactical feedback system for a turf maintenance vehicle is disclosed. The system includes an input device that detects a steering angle and/or a ground speed of the turf maintenance vehicle. The input device transmits an input signal correlative to the steering angle and/or the ground speed of the turf maintenance vehicle. The system also includes an output device that affects the steering resistance, the turning ratio, the speed limit, the ground speed and/or the turning angle limit of the turf maintenance vehicle. Furthermore, the system includes a controller that receives the input signal and outputs a control signal to the output device based on the input signal so as to change the steering resistance, the turning ratio, the speed limit, the ground speed and/or the turning angle limit of the turf maintenance vehicle based on the input signal.

In another aspect, a method of controlling a turf maintenance vehicle is disclosed. The method includes detecting a steering angle and/or a ground speed of the turf maintenance vehicle. The method also includes transmitting an input signal to a controller. The input signal correlates to the steering angle and/or the ground speed of the turf maintenance vehicle. Furthermore, the method includes changing a steering resistance, a turning ratio, a speed limit, a ground speed, and a turning angle limit of the turf maintenance vehicle according to the control signal that is transmitted from the controller and that is based on the input signal.

In still another aspect, a method of controlling a turf maintenance vehicle is disclosed. The method includes detecting a ground speed of the turf maintenance vehicle and determining whether the ground speed is above a predetermined threshold level. The method also includes transmitting an input signal to a controller. The input signal correlates to the ground speed of the turf maintenance vehicle. Also, the method includes increasing a steering resistance with a magnetorheological fluid, increasing a turning ratio, and decreasing a turning angle limit of the turf maintenance vehicle when the ground speed is above the predetermined threshold level.

Moreover, a method of controlling a turf maintenance vehicle is disclosed. The method includes detecting a steering angle of the turf maintenance vehicle according to a position of the steering wheel assembly and/or a ground traction system. The method also includes transmitting an input signal to a controller. The input signal correlates to the steering angle of the turf maintenance vehicle. Furthermore, the method includes changing a speed limit and/or a ground speed of the turf maintenance vehicle according to a control signal that is transmitted from the controller and that is based on the input signal.

In an additional aspect, a turf maintenance vehicle is disclosed that includes a frame, a turf maintenance implement supported by the frame, and a ground traction system including a plurality of wheels supporting the frame. The turf maintenance vehicle further includes a power delivery system that delivers power to the turf maintenance implement and/or the ground traction system. Moreover, the turf maintenance vehicle includes an input device that detects a steering angle and/or a ground speed of the turf maintenance vehicle and that transmits an input signal correlative to the steering angle and/or the ground speed of the turf maintenance vehicle. Furthermore, the turf maintenance vehicle includes an output device that affects a steering resistance, a turning ratio, a speed limit, the ground speed, and/or a turning angle limit of the turf maintenance vehicle. The turf maintenance vehicle additionally includes a controller that receives the input signal and outputs a control signal to the output device based on the input signal so as to change the steering resistance, the turning ratio, the speed limit, the ground speed, and/or the turning angle limit of the turf maintenance vehicle based on the input signal.

In still another aspect, a turf maintenance vehicle is disclosed that includes a frame, a turf maintenance implement supported by the frame, and a ground traction system including a plurality of wheels supporting the frame. The turf maintenance vehicle additionally includes a power delivery system that delivers power to the turf maintenance implement and/or the ground traction system. The turf maintenance vehicle also includes a steering system that changes a direction of travel of the turf maintenance vehicle. Furthermore, the turf maintenance vehicle includes a ground speed sensor that detects a ground speed of the turf maintenance vehicle and a steering angle sensor that detects a steering angle of the steering system. Additionally, the turf maintenance vehicle includes a controller that changes a steering resistance of the steering system, the turning ratio of the steering system, the speed limit of the ground traction system, the ground speed of the ground traction system, and/or the turning angle limit of the steering system based on the ground speed detected by the ground speed sensor and/or the steering angle detected by the steering angle sensor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
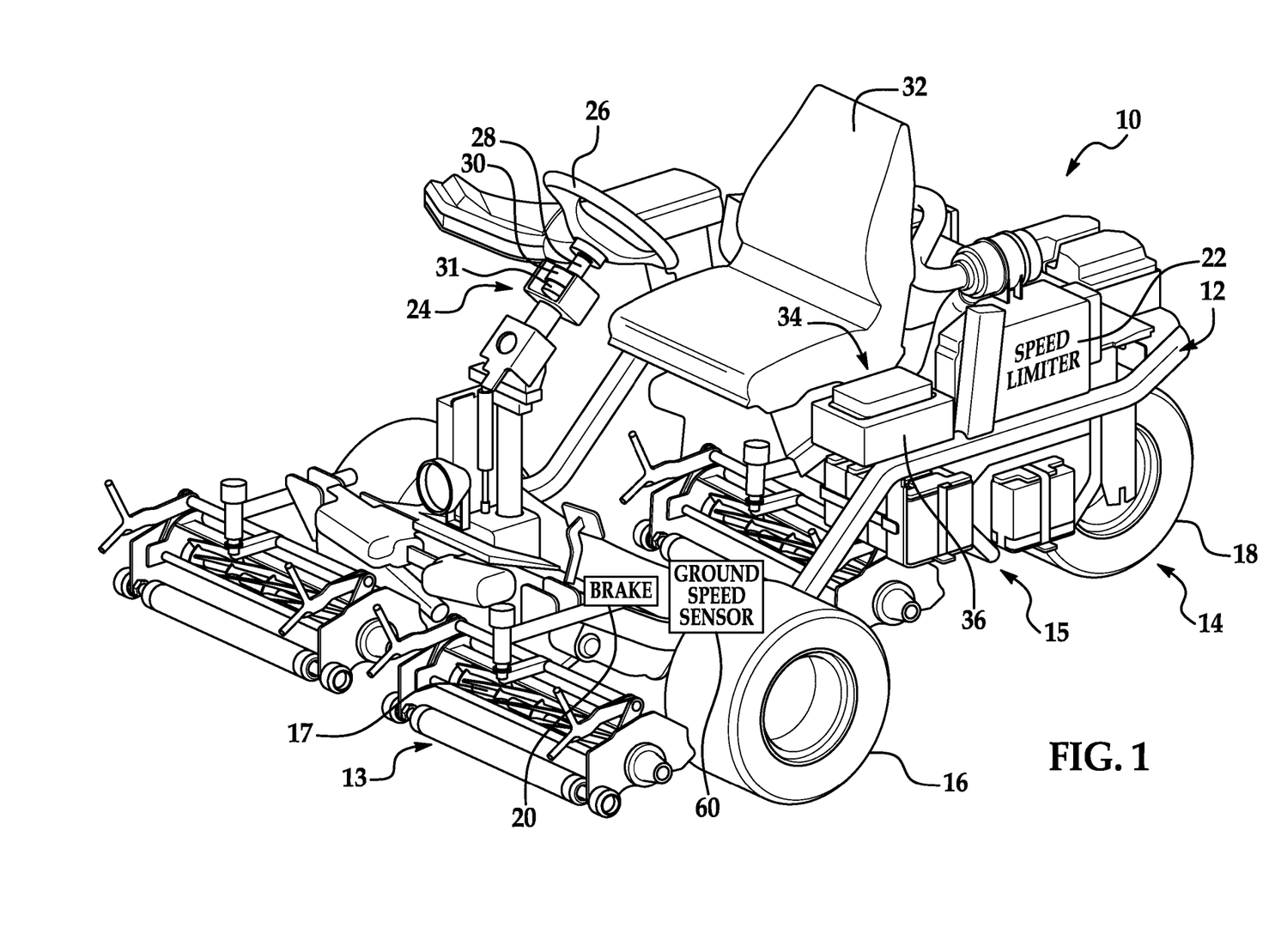
FIG. 1 is a perspective view of a turf maintenance vehicle according to the present disclosure.

Referring initially FIG. 1, a turf maintenance vehicle (i.e., a grounds keeping vehicle), such as a mower 10 is illustrated. In the embodiment shown, the mower 10 is a riding mower that generally includes a frame 12, a turf maintenance implement system 13, and a ground traction system generally indicated at 14. It will be understood by one skilled in the art that the teachings herein are applicable to any suitable turf maintenance vehicle, including, for instance, mowers, groomers, sand rakes, aerators, utility vehicles and other turf maintenance equipment, having a power-assisted steering system.

The turf maintenance implement system 13 is supported by the frame 12 and can be of any suitable type for turf maintenance purposes. In some embodiments, the turf maintenance implement system 13 includes a plurality of reel cutters 17 for cutting grass or for other turf maintenance operations. However, it will be appreciated that the turf maintenance implement system 13 can include any suitable implement, including, for instance, mowing implements, grooming implements, raking implements, aerating implements, and other turf maintenance implements.

The ground traction system 14 supports the frame 12 and provides propulsion and steering for the mower 10. In the embodiment shown, the ground transportation system 14 includes a plurality of front wheels 16, which are driven to propel the mower 10, and a rear wheel 18, which can turn relative to the frame 12 to thereby steer the mower 10. Also, the ground traction system 14 includes a brake, schematically indicated at 20. The brake 20 can be of any suitable type for reducing the ground speed of the mower 10.

Moreover, the mower 10 includes a power delivery system generally indicated at 15. The power delivery system 15 can be of any suitable type for generating power and transmitting power to the ground traction system 14 and/or the turf maintenance implement system 13. For instance, the power delivery system 15 can include an internal combustion engine for generating mechanical or electrical energy, a plurality of batteries, or a combination of the two. As such, the power delivery system 15 generates and delivers power to the ground traction system 14 to thereby propel the mower. Also, in one embodiment, the power delivery system 15 delivers power to the turf maintenance implement system 13 to thereby rotate the reel cutters 17.

In the embodiment shown, the power delivery system 15 also includes a speed limiter schematically indicated at 22. Generally speaking, a speed limit (i.e., a top speed) of the mower 10 is set according to the speed limiter 22. In various embodiments, the speed limiter 22 is operatively coupled to a throttle (not shown) to thereby limit the power available to the ground traction system 14. Also, in various embodiments, the speed limiter 22 is programmed logic that determines the amount of power delivered from the power delivery system 15 to the ground traction system 14.

The mower 10 also includes a steering wheel assembly generally indicated at 24. The steering wheel assembly 24 includes a steering wheel 26, a shaft 28 extending from the steering wheel 26 and a steering resistance device 30. The steering resistance device 30 is operatively coupled to the shaft 28. As a user turns the steering wheel 26, the shaft 28 rotates about its axis, and the steering resistance device 30 provides a predetermined level of turning resistance against rotation of the shaft 28.

Figure 3:
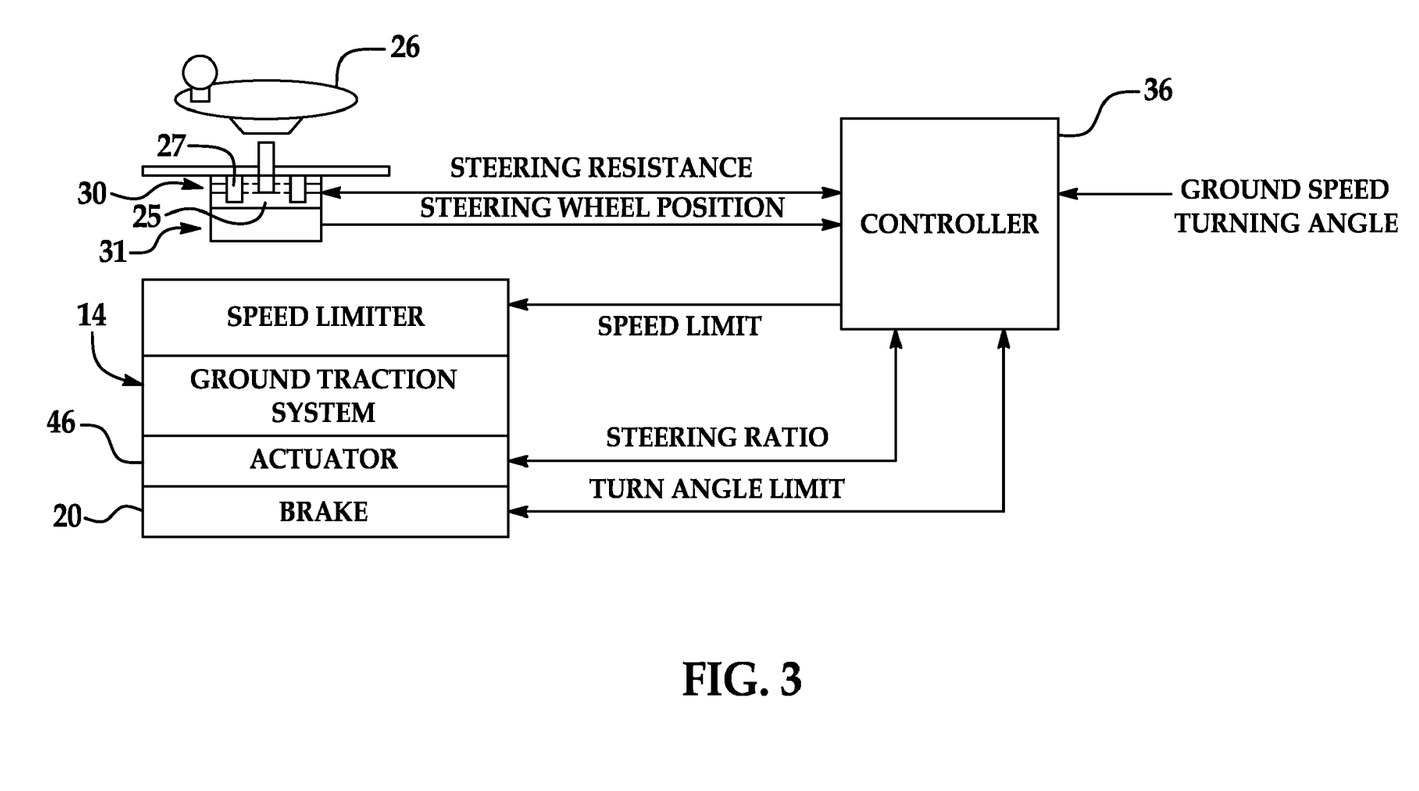
FIG. 3 is a schematic view of the dynamic tactical steering feedback system for the turf maintenance vehicle of FIG. 1.

In some embodiments, the steering resistance device 30 includes a magnetorheological fluid 25 and an electromagnet 27 (FIG. 3). The magnetorheological fluid 25 can be a known fluid that includes magnetic-field-susceptible particles (e.g., carbonyl iron, powdered iron, iron/cobalt alloys, nickel alloys, etc.) suspended in a liquid vehicle (e.g., mineral oil, synthetic hydrocarbon oil, silicone oil, water, glycol, synthetic ester, perfluorinated polyether, etc.) at 20% to 40% by volume. In some embodiments, the magnetic-field-susceptible particles measure from 1 to 10 microns typically. There can also include additives such as suspending agents, thixotropes, anti-wear and anti-corrosion additives, friction modifiers, etc. The magnetorheological fluid 25 is Newtonian in the absence of an applied magnetic field, but the fluid 25 increases in viscosity and develops yield strength as a magnetic field is applied. Specifically, when current is increased to the electromagnet 27, a magnetic field increases in strength to thereby affect the properties of the magnetorheological fluid 25. As a result, resistance to rotating the shaft 28 increases.

It will be appreciated that the steering resistance device 30 can include any other suitable device, including, for example, a friction clutch assembly that includes a plurality of friction plates that can selectively engage and disengage. The friction clutch assembly provides steering resistance via pulse modulation (i.e., by successively engaging and disengaging the friction plates at a predetermined duty cycle). The duty cycle of the pulse modulation can be changed in order to change the amount of steering resistance supplied by the friction clutch assembly.

The steering wheel assembly 24 also includes a steering wheel position sensor 31. The steering wheel position sensor 31 detects the rotated position (i.e., the steering angle) of the steering wheel 26. Also, in one embodiment, the steering wheel position sensor 31 detects a change in position of the steering wheel 26. The mower 10 also includes a seat 32. The seat 32 is positioned behind the steering wheel assembly 24 and provides a place for a user to sit during operation of the mower 10.

The mower 10 further includes a dynamic tactical steering feedback system generally indicated at 34. The feedback system 34 is largely embodied by a controller 36, which includes programmed logic for effecting the steering and/or speed of the mower 10 as will be described in greater detail below. The feedback system 34 also includes a plurality of input devices that detect the status of the mower 10 and that transmit to the controller 36 input signals correlating to the status of the mower 10 as will be described in greater detail below. Furthermore, the feedback system 34 includes a plurality of output devices that receive control signals from the controller 36 to thereby change the status of the mower 10 as will be described in greater detail below.

Figure 2:
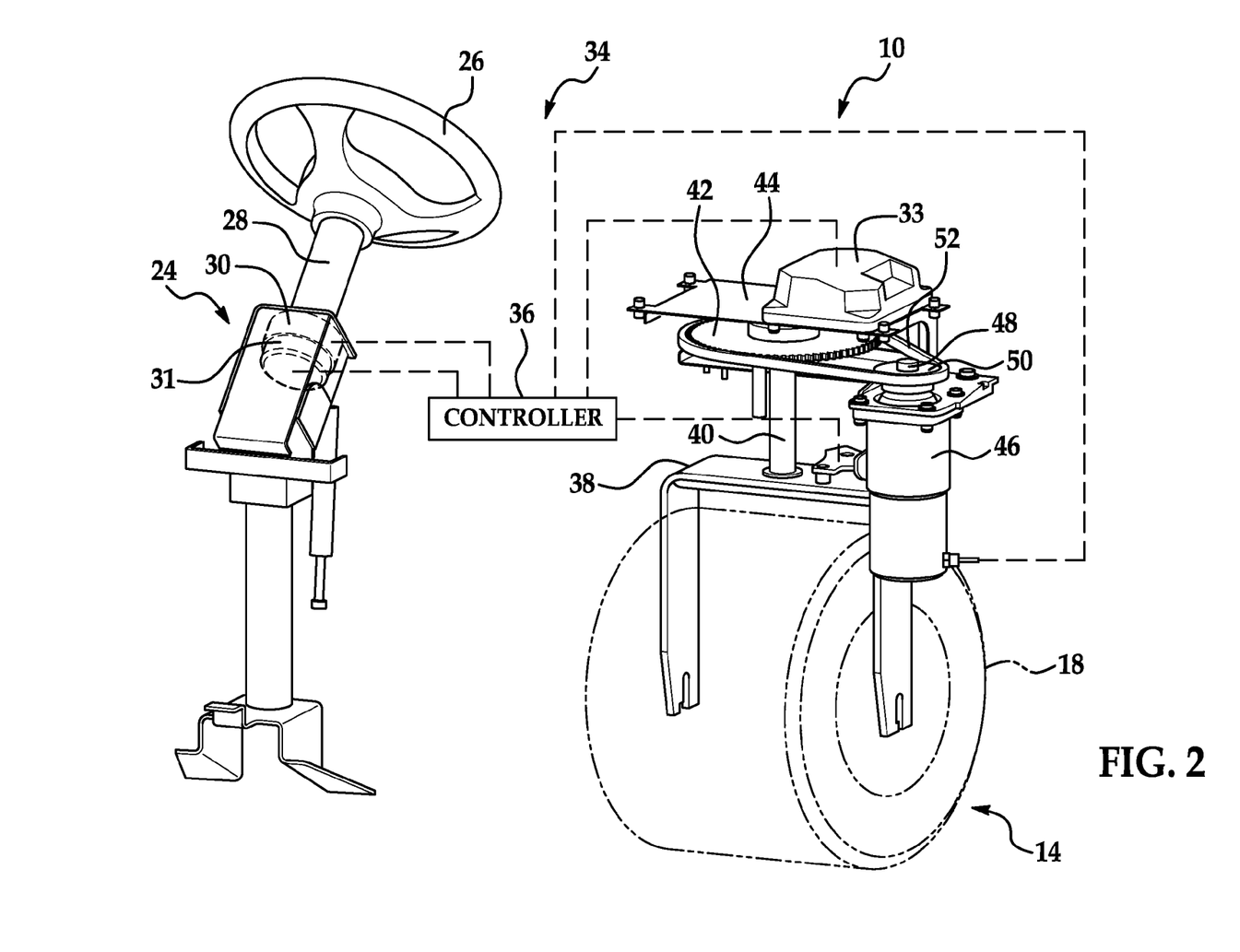
FIG. 2 is a schematic view of a dynamic tactical steering feedback system for the turf maintenance vehicle of FIG. 1.

Referring now to FIGS. 2 and 3, steering of the mower 10 will be explained in greater detail. As shown, the rear wheel 18 is rotatably mounted on a fork 38 of the ground traction system 14. A shaft 40 is fixed to the fork 38 and extends upward therefrom. A gear 42 is fixed to an end of the shaft 40 and is spaced from the fork 38. Also, the fork 38, the shaft 40, and the gear 42 are rotatably mounted to a bracket 44, which is fixed to the frame 12 of the mower 10. Also, the ground traction system 14 includes an actuator 46, which is is in communication with the controller 36. The actuator 46 can be of any suitable type, and in one embodiment, the actuator 46 is an electric motor. The actuator 46 includes a shaft 48 that is drivingly rotated according to signals transmitted by the controller 36. A gear 50 is fixed to the shaft 48, and a belt 52 rotatably engages the gears 42, 50.

As will be described in greater detail below, the controller 36 transmits an output signal to the actuator 46 so as to vary the amount of rotation of the output shaft 48, which causes rotation of the gear 42, shaft 40 and fork 38. In one embodiment, the controller 36 varies the current supplied to the actuator 46, to thereby vary the amount of turning of the rear steering wheel 18. As such, the rear wheel 18 is turned (i.e., the steering angle changes) according to the output signal transmitted from the controller 36.

It will also be appreciated that the rear wheel 18 has a steering angle limit (i.e., the maximum turning angle of the rear wheel 18 away from a centered, straight direction). In various embodiments, the controller 36 sets the steering angle limit of the rear steering wheel 18. Furthermore, in various embodiments, the steering angle limit is variable.

The controller 36 is in communication with the steering wheel position sensor 31 and receives input signals from the steering wheel position sensor 31 based on the detected steering wheel position. The controller 36 generates and transmits an output signal to the actuator 46 based on the input signal received from the steering wheel position sensor 31. Accordingly, when a user turns the steering wheel 26, the steering wheel position sensor 31 detects the steering wheel position, the steering wheel position sensor 31 transmits an input signal to the controller 36 based on the position of the steering wheel 26, and the controller 36 transmits an output signal to the actuator 46. Then, the actuator 46 drivingly rotates the shaft 48 to thereby produce the desired amount of turning of the rear wheel 18.

As is generally known, the term "steering ratio" generally refers to the ratio between the amount of turning input of the steering wheel 26 and the amount of turning output of the rear wheel 18. As will be discussed, the feedback system 34 varies the steering ratio of the mower 10. For instance, when the feedback system 34 is set for a higher turning ratio, more turning of the steering wheel 26 is needed to produce a certain amount of turning of the rear wheel 18. Also, when the feedback system 34 is set for a lower turning ratio, less turning of the steering wheel 26 is needed to produce the same amount of turning of the rear wheel 18.

It will be understood that the mower 10 described above includes a drive-by-wire system for steering control. However, it will be appreciated that the mower 10 could depend on one or more mechanical linkages operatively coupling the steering wheel assembly 24 and the ground traction system 14 without departing from the scope of the present disclosure.

As will be described in greater detail below, the dynamic tactical steering feedback system 34 generally detects the ground speed and/or the steering angle of the mower 10. An input signal is generated based on this information, and the input signal is transmitted to the controller 36. Then, the controller 36 outputs a control signal to one or more output devices to thereby change the steering resistance, the turning ratio, the speed limit, the ground speed, and/or the turning angle limit of the mower 10 based on the detected steering angle and/or ground speed of the mower 10. As such, the feedback system 34 improves the driver control of the mower 10. In various embodiments, the mower 10 includes a ground speed sensor 60 that detects the ground speed of the mower 10. The ground speed sensor 60 can be of any suitable type.

The steering angle of the mower 10 can be detected in any suitable fashion. In various embodiments, the steering angle of the mower 10 is detected by the steering wheel position sensor 31. In other embodiments, the mower 10 includes a steering angle sensor 33 (FIG. 2), which is operatively mounted to the ground traction system 14. More, specifically, the steering angle sensor 33 detects the position of the rear wheel 18. It will be appreciated that the steering angle of the mower 10 can be detected by one or both of the sensors 31, 33.

In some embodiments, the feedback system 34 automatically changes the steering resistance of the mower 10. First, the ground speed is detected by the ground speed sensor 60, and a correlative input signal is transmitted to the controller 36. In one embodiment, if the controller 36 determines that the detected ground speed is above a predetermined threshold level (i.e., the mower 10 is traveling at a relatively high rate of speed), the controller 36 transmits a control signal to the steering resistance device 30 to increase the steering resistance against turning of the steering wheel 26. Also, in other embodiments, if the controller 36 determines that the ground speed is below the predetermined threshold speed (i.e., the mower 10 is traveled at a relatively low rate of speed), the controller 36 transmits a control signal to the steering resistance device 30 to decrease the steering resistance against turning of the steering wheel 26. It will be appreciated that there could be a plurality of threshold speeds and a corresponding number of steering resistance levels. Thus, when the mower 10 is traveling quickly, the user is less likely to inadvertently turn the wheel 26 because it takes more force to do so. Also, when the mower 10 is traveling slower, the steering wheel 26 can be turned more easily by the user to improve maneuverability of the mower 10. Thus, driver control is improved.

In other embodiments, the steering ratio is automatically changed by the feedback system 34. The ground speed sensor 60 detects the ground speed of the mower 10, and transmits a correlative input signal to the controller 36. If the controller 36 determines that the ground speed is above a predetermined threshold speed (i.e., the mower 10 is traveling at a relatively high rate of speed), the controller 36 outputs a control signal to the actuator 46 for increasing the steering ratio. Also, if the controller 36 determines that the ground speed of the mower 10 is below the predetermined threshold speed (i.e., the mower 10 is traveling at a relatively low rate of speed), the controller 36 outputs a control signal to the actuator 46 for decreasing the steering ratio of the mower 10. It will be appreciated that there could be a plurality of threshold speeds and a corresponding number of steering ratios set by the controller 36. Thus, when the mower 10 is traveling quickly, inadvertent turning of the steering wheel 26 is less likely to turn the rear wheel 18 because the steering ratio is increased. Also, when the mower 10 is traveling slower, the rear wheel 18 is more responsive to turning of the steering wheel 26 for improved maneuverability. Accordingly, control of the mower 10 is improved.

In other embodiments, the steering angle limit is automatically changed by the feedback device 34. The ground speed is detected by the ground speed sensor 60, and a correlative input signal is transmitted to the controller 36. If the controller 36 determines that the ground speed is above a predetermined threshold speed (i.e., the mower 10 is traveling at a relatively high rate of speed), the controller 36 decreases the turning angle limit and allows for turning of the rear wheel 18 only within that reduced limit. If the controller 36 determines that the ground speed is less than the predetermined threshold speed (i.e., the mower 10 is traveling at a relatively low rate of speed), the controller 36 increases the turning angle limit and allows for turning of the rear wheel 18 within the increased limit. In other embodiments, the maximum amount of turning of the rear wheel 18 in a high speed situation is 30 degrees away from the centerline of the mower 10, and the maximum tire angle in a low speed situation is 52 degrees. It will be appreciated that there could be a plurality of threshold speeds and a corresponding number of steering angle limits set by the controller 36. Accordingly, when the mower 10 is traveling quickly, the amount of turning of the rear wheel 18 is limited, and loss of control of the mower 18 due to a high speed, sharp turn is less likely. Also, when the mower 10 is traveling slowly, the mower 10 can be turned more sharply to improve maneuverability.

In other embodiments, the feedback device 34 automatically changes the speed limit of the mower 10. The steering angle is detected by the steering wheel position sensor 31 and/or the steering angle sensor 33, and a correlative input signal is transmitted to the controller 36. If the steering angle is beyond a predetermined threshold angle (i.e., a relatively sharp turn is detected), the controller 36 outputs a control signal to the speed limiter 22 to thereby reduce the maximum speed of the mower 10. If the controller 36 determines that the steering angle is below a predetermined threshold angle (i.e., the mower 10 is traveling in a generally straight direction), then the controller 36 outputs a control signal to the speed limiter 22 to increase the maximum speed of the mower 10. It will be appreciated that there could be a plurality of threshold angles and a corresponding number of speed limits set by the controller 36. In other embodiments, when turning of the mower 10 is detected the speed limit of the mower 10 is set at five miles per hour (5 mph). Thus, the mower 10 can travel at a higher rate of speed when traveling straight, and the speed limit of the mower 10 is reduced when turning. Accordingly, control of the mower 10 is improved.

Furthermore, in various embodiments, the feedback device 34 automatically changes the ground speed of the mower 10. More specifically, the ground speed sensor 60 detects the ground speed of the mower 10, and the steering angle is detected by the steering wheel position sensor 31 and/or the steering angle sensor 33. A correlative input signal is transmitted to the controller 36, and the controller 36 outputs a control signal to either maintain the detected ground speed or reduce the ground speed. More specifically, if the controller 36 determines that the steering angle is beyond a predetermined threshold angle (i.e., a tight turn is detected) and the ground speed is above a predetermined threshold level (i.e., the mower 10 is traveling relatively fast), the controller 36 outputs a control signal to the brake 20 to activate to slow the mower 10. In other embodiments, when the mower is traveling above five miles per hour (5 mph) and the user turns the wheel to turn the mower 10 sharply, the brake 20 is automatically activated to reduce the mower speed below five miles per hour (5 mph). As such, the user is less likely to lose control of the mower 10 due to a high speed, tight turn situation.

Figure 4:
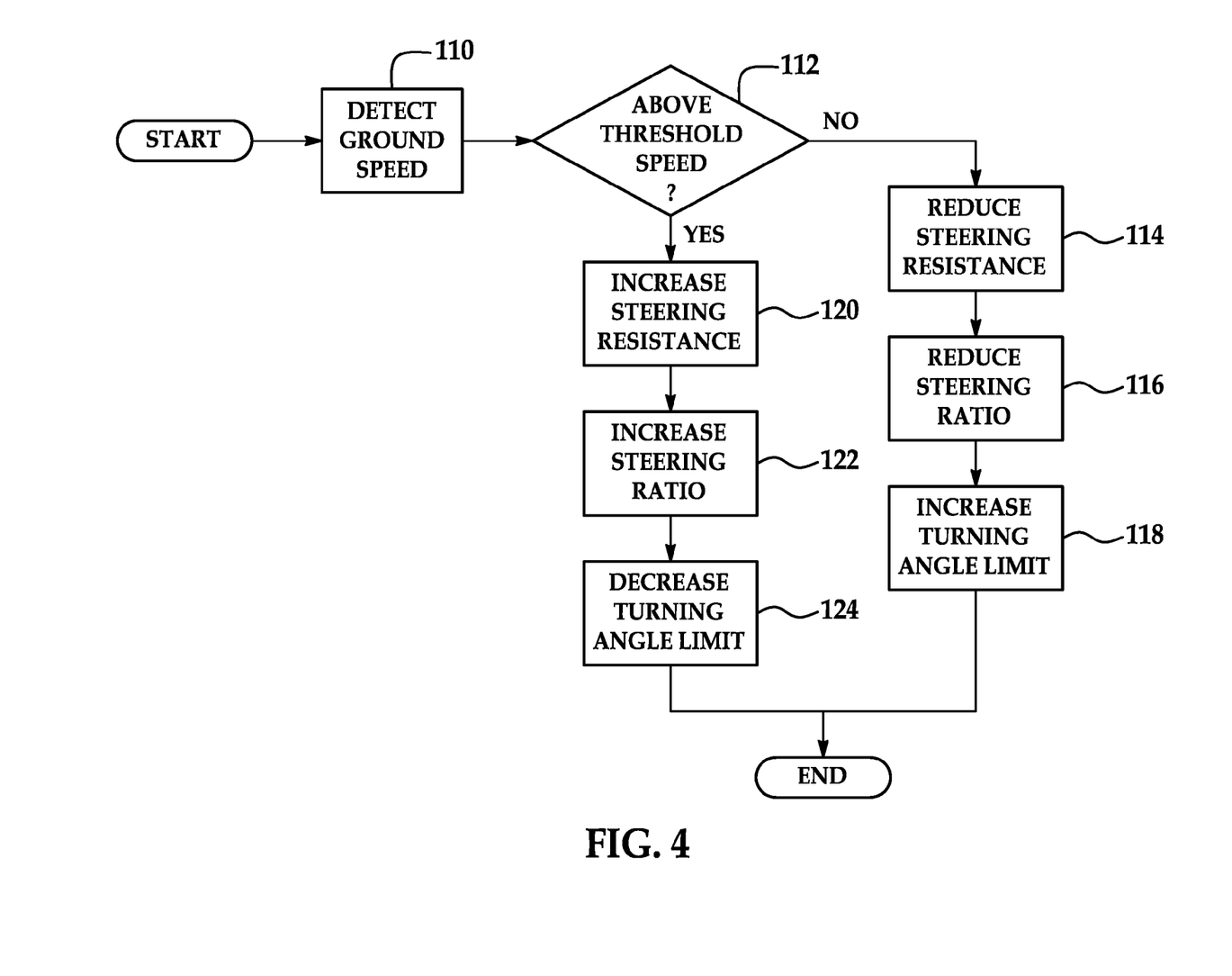
FIG. 4 is a flowchart illustrating a method of operation for the dynamic tactical steering feedback system.

Referring now to FIG. 4, a method of automatically changing the steering resistance, steer ratio, and turning angle limit is represented. In the embodiment shown, the method begins at block 110 in which the ground speed of the mower 10 is detected by the ground speed sensor 60. Then, in decision block 112, the controller 36 determines whether the mower 10 is traveling above the threshold speed. If the result is negative, then the steering resistance is reduced at 114, the steering ratio is decreased at 116, and the turning angle limit is increased at 118 as discussed above. If the result of the decision in decision block 112 is positive, then the steering resistance is increased at 120, the steering ratio is increased at 122, and the turning angle limit is decreased at 124 as discussed above. It will be appreciated that the feedback system 34 can, according to various embodiments, vary only one or multiple ones of the steering resistance, steer ratio, and turning angle limit based on the detected ground speed without departing from the scope of the present disclosure.

Figure 5:
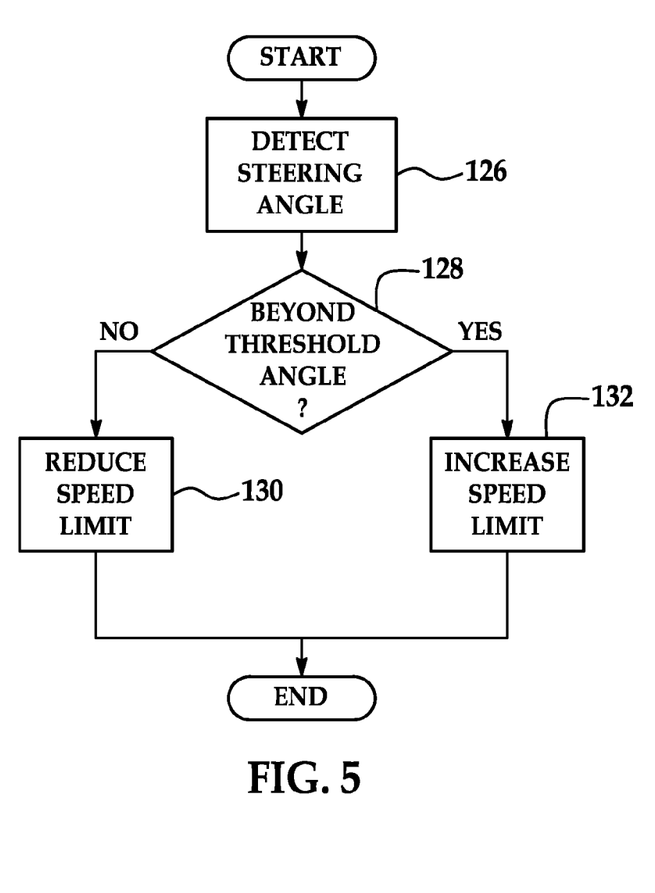
FIG. 5 is a flowchart illustrating a method of operation for the dynamic tactical steering feedback system.

Referring now to FIG. 5, a method of changing the speed limit of the mower 10 is illustrated. The method begins at 126, in which the steering angle of the mower 10 is detected as discussed above. Then, in decision block 128, the controller 36 determines whether the steering angle is beyond the threshold angle. If the result of the decision is negative, at 130, the speed limit of the mower 10 is reduced. If the result of the decision at decision block 128 is positive, then the speed limit of the mower 10 is increased in step 132.

Figure 6:
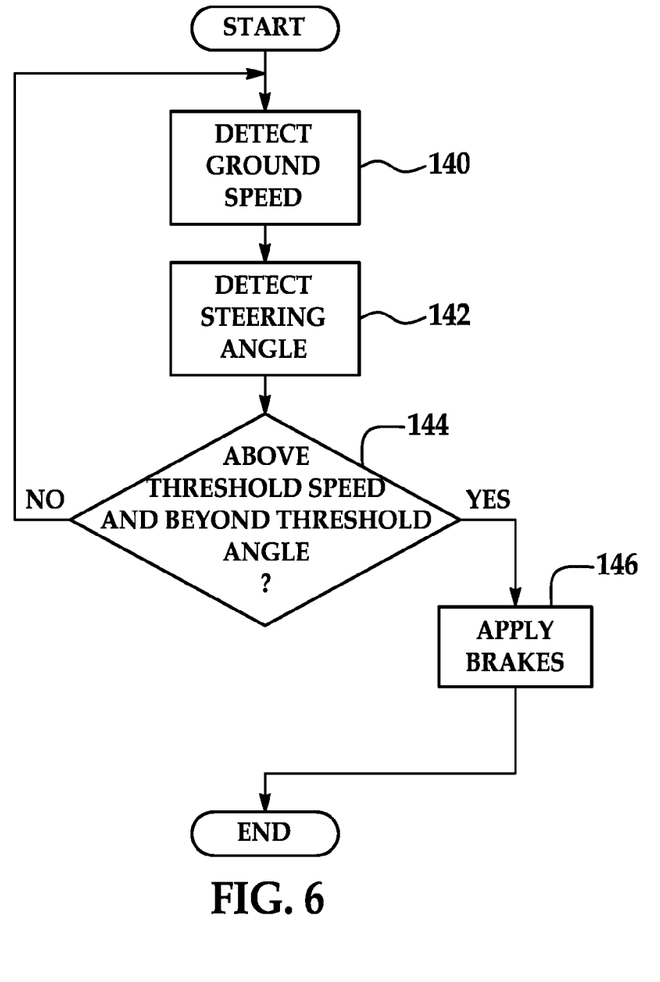
FIG. 6 is a flowchart illustrating a method of operation for the dynamic tactical steering feedback system.

Referring now to FIG. 6, a method of automatically changing the ground speed of the mower 10 is illustrated. The method begins at 140 in which the ground speed of the mower 10 is detected. Then, at 142, the steering angle of the mower 10 is detected. Next, in decision block 144, the controller 36 determines whether the detected speed is above the threshold speed and whether the steering angle is beyond the threshold angle. If the results of the decision are negative, the process reverts back to blocks 140 and 142. However, if the results of the decision block 144 is positive, the controller 36 outputs the control signal to the brake 20, such that the brake 20 is automatically applied in step 146.

It will be appreciated that the dynamic tactical steering feedback system 34 improves driver control of the mower 10. It will also be appreciated that the system 34 can be configured as a feedback control system such that an output signal from the respective output device (i.e., the steering resistance device 30, the actuator 46, etc.) is transmitted back to the controller 36 to control the dynamic behavior of the mower 10.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, steps, elements and/or functions between various embodiments is expressly contemplated herein so that one of ordinary skill in the art would appreciate from this disclosure that features, steps, elements and/or functions of one embodiment may be incorporated into another embodiment as appropriate, unless described otherwise above. Moreover, many modifications may be made to adapt a configuration to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A dynamic tactical steering feedback system for a turf maintenance vehicle comprising:
   an input device that detects a steering angle or a ground speed of the turf maintenance vehicle and that transmits an input signal correlative to the steering angle or the ground speed of the turf maintenance vehicle;

an output device that affects at least one of a steering resistance, a turning ratio, a speed limit, the ground speed, or a turning angle limit of the turf maintenance vehicle;

a controller that receives the input signal and outputs a control signal to the output device based on the input signal so as to change the at least one of the steering resistance, the turning ratio, the speed limit, the ground speed, or the turning angle limit of the turf maintenance vehicle based on the input signal; and a ground traction system, wherein the input device is a steering angle sensor operatively coupled to the ground traction system, the steering angle sensor detecting a position of the ground traction system to determine the steering angle of the turf maintenance vehicle.

2. The dynamic tactical steering feedback system of claim 1, further comprising a steering wheel assembly, wherein the input device is a steering wheel position sensor operatively coupled to the steering wheel assembly and that detects a position of the steering wheel assembly to detect the steering angle of the turf maintenance vehicle.

3. The dynamic tactical steering feedback system of claim 2, further comprising a ground traction system, wherein the output signal includes a turning ratio signal, and wherein the output device is an actuator that changes a turning angle of the traction assembly based on the turning ratio signal.

4. The dynamic tactical steering feedback system of claim 1, further comprising a ground traction system, wherein the output device is an actuator that changes the turning angle of the ground traction system, and wherein the actuator receives the control signal from the controller so as to accordingly change the turning angle limit of the turf maintenance vehicle.

5. The dynamic tactical steering feedback system of claim 1, further comprising a ground traction system, wherein the input device is a ground speed sensor operatively coupled to the ground traction system that detects the ground speed of the turf maintenance vehicle.

6. The dynamic tactical steering feedback system of claim 1, further comprising a steering wheel assembly, wherein the output device is a steering resistance device operatively coupled to the steering wheel assembly, and wherein the steering resistance device changes a resistance-to-turning of the steering wheel assembly to thereby change the steering resistance of the turf maintenance vehicle.

7. The dynamic tactical steering feedback system of claim 6, wherein the steering resistance device includes at least one of:

a magnetorheological fluid that variably supplies the resistance-to-turning and an electromagnet, and wherein the control signal changes a current supplied to the electromagnet to thereby change the resistance-to-turning supplied by the magnetorheological fluid; or a friction clutch assembly that includes a plurality of friction plates that selectively engage and disengage, wherein the friction clutch assembly supplies the resistance-to-turning via a pulse modulation, and wherein the control signal changes a duty cycle of the pulse modulation to change the resistance-to-turning supplied by the friction clutch assembly.

8. The dynamic tactical steering feedback system of claim 1, further comprising a power delivery system and a ground traction system that receives power from the power delivery system to thereby propel the turf maintenance vehicle, and wherein the output device is a brake system that reduces speed of the turf maintenance vehicle below the speed limit.

9. The dynamic tactical steering feedback system of claim 1, further comprising a power delivery system and a ground traction system that receives power from the power delivery system to thereby propel the turf maintenance vehicle, and wherein the output device is a speed limiter of the power delivery system that changes the speed limit of the turf maintenance vehicle.

10. A method of controlling a turf maintenance vehicle comprising:

detecting a steering angle or a ground speed of the turf maintenance vehicle;

transmitting an input signal to a controller, the input signal correlating to the steering angle or the ground speed of the turf maintenance vehicle; and changing at least one of a steering resistance, a turning ratio, a speed limit, the ground speed, or a turning angle limit of the turf maintenance vehicle according to a control signal that is transmitted from the controller and that is based on the input signal wherein the changing the steering resistance, the turning ratio, the speed limit, the ground speed, or the turning angle limit comprises at least one of:

changing current sent to an electromagnet to change a magnetic field to thereby change the properties of a magnetorheological fluid to thereby change the steering resistance; or changing a duty cycle of pulse modulation of a friction clutch assembly to thereby change the steering resistance.

11. The method of claim 10, wherein the detecting at least one of the steering angle and the ground speed comprises detecting whether the ground speed is above a predetermined threshold speed, and wherein the changing at least one of the steering resistance, the turning ratio, the speed limit, the ground speed, or the turning angle limit comprises at least one of increasing the steering resistance, increasing the turning ratio, or reducing the turning angle limit when the ground speed is above the predetermined threshold speed.

12. The method of claim 10, wherein the detecting at least one of the steering angle or the ground speed comprises detecting whether the steering angle is beyond a predetermined threshold angle, and wherein the changing at least one of the steering resistance, the turning ratio, the speed limit, the ground speed, or the turning angle limit comprises decreasing the speed limit when the steering angle is beyond a predetermined threshold angle.

13. The method of claim 10, wherein the detecting at least one of the steering angle or the ground speed comprises detecting whether the ground speed is above a predetermined threshold speed and detecting whether the steering angle is beyond a predetermined threshold angle, and wherein the changing at least one of the steering resistance, the turning ratio, the speed limit, the ground speed, or the turning angle limit comprises reducing the ground speed to no higher than the predetermined threshold speed when the ground speed is above the predetermined threshold speed and the steering angle is beyond the predetermined threshold angle.

14. The method of claim 13, wherein the reducing the ground speed comprises automatically applying a brake.

15. The method of claim 10, wherein the detecting at least one of the steering angle and the ground speed of the turf maintenance vehicle comprises detecting the steering angle from at least one of a steering wheel position or a ground traction assembly position.

16. A turf maintenance vehicle comprising:

a frame;

a turf maintenance implement supported by the frame;

a ground traction system including a plurality of wheels supporting the frame;

a power delivery system that delivers power to at least one of the turf maintenance implement or the ground traction system;

an input device that detects a steering angle or a ground speed of the turf maintenance vehicle and that transmits an input signal correlative to the steering angle or the ground speed of the turf maintenance vehicle;

an output device that affects at least one of a steering resistance, a turning ratio, a speed limit, the ground speed, or a turning angle limit of the turf maintenance vehicle; and a controller that receives the input signal and outputs a control signal to the output device based on the input signal so as to change the at least one of the steering resistance, the turning ratio, the speed limit, the ground speed, or the turning angle limit of the turf maintenance vehicle based on the input signal.

17. A turf maintenance vehicle comprising:

a frame;

a turf maintenance implement supported by the frame;

a ground traction system including a plurality of wheels supporting the frame;

a power delivery system that delivers power to the turf maintenance implement or the ground traction system;

a steering system that changes a direction of travel of the turf maintenance vehicle;

a ground speed sensor that detects a ground speed of the turf maintenance vehicle;

a steering angle sensor that detects a steering angle of the steering system; and a controller that changes at least one of a steering resistance of the steering system, the turning ratio of the steering system, the speed limit of the ground traction system, the ground speed of the ground traction system, or the turning angle limit of the steering system based on at least one of the ground speed detected by the ground speed sensor or the steering angle detected by the steering angle sensor.

18. A dynamic tactical steering feedback system for a turf maintenance vehicle comprising:

an input device that detects a steering angle or a ground speed of the turf maintenance vehicle and that transmits an input signal correlative to the steering angle or the ground speed of the turf maintenance vehicle;

an output device that affects at least one of a steering resistance, a turning ratio, a speed limit, the ground speed, or a turning angle limit of the turf maintenance vehicle; and a controller that receives the input signal and outputs a control signal to the output device based on the input signal so as to change the at least one of the steering resistance, the turning ratio, the speed limit, the ground speed, or the turning angle limit of the turf maintenance vehicle based on the input signal; and a ground traction system, wherein the output device is an actuator that changes the turning angle of the ground traction system, and wherein the actuator receives the control signal from the controller so as to accordingly change the turning angle limit of the turf maintenance vehicle.

19. A dynamic tactical steering feedback system for a turf maintenance vehicle comprising:

an input device that detects a steering angle or a ground speed of the turf maintenance vehicle and that transmits an input signal correlative to the steering angle or the ground speed of the turf maintenance vehicle;

an output device that affects at least one of a steering resistance, a turning ratio, a speed limit, the ground speed, or a turning angle limit of the turf maintenance vehicle; and a controller that receives the input signal and outputs a control signal to the output device based on the input signal so as to change the at least one of the steering resistance, the turning ratio, the speed limit, the ground speed, or the turning angle limit of the turf maintenance vehicle based on the input signal;

a ground traction system, wherein the output device is an actuator that changes the turning angle of the ground traction system, and wherein the actuator receives the control signal from the controller so as to accordingly change the turning angle limit of the turf maintenance vehicle; and a ground traction system, wherein the input device is a ground speed sensor operatively coupled to the ground traction system that detects the ground speed of the turf maintenance vehicle.

\* \* \* \* \*